United States Patent
Fellows et al.

[15] 3,639,166

[45] Feb. 1, 1972

[54] COATED TRANSFER MEDIUM FOR PRODUCING SCRATCH AND SMUDGE RESISTANT MARKS

[72] Inventors: Charles T. Fellows, Kettering; Stanley R. Hermann, Xenia, both of Ohio

[73] Assignee: The National Cash Register Company, Dayton, Ohio

[22] Filed: May 6, 1970

[21] Appl. No.: 35,230

[52] U.S. Cl. .............................117/234, 117/36.1, 117/36.4, 117/138.8, 260/28.5 A, 260/28.5 AV, 260/856
[51] Int. Cl. .......................................B41m 5/10, C04b 35/00
[58] Field of Search ............................117/36.1, 36.4, 234; 260/28.5 A, 28.5 AV, 856

[56] References Cited

UNITED STATES PATENTS

| | | | |
|---|---|---|---|
| 2,560,773 | 7/1951 | Lovell | 117/36.1 |
| 2,777,781 | 1/1957 | Kordig et al. | 117/36.4 |
| 3,449,149 | 10/1969 | Toussaint | 117/36.4 |
| 3,539,376 | 11/1970 | Otani et al. | 117/36.4 |
| 3,561,992 | 2/1971 | Breidthardt | 117/36.4 |

*Primary Examiner*—Murray Katz
*Attorney*—E. Frank McKinney and David L. Johnson, Jr.

[57] ABSTRACT

A transfer medium comprising a base having a transferable coating composition thereon. The coating composition comprises about 3 to 40 percent by weight of an olefinic polymer; about 3 to 40 percent by weight of a wax; about 15 to 70 percent by weight of a thermoplastic aminotriazine-sulfonamide-aldehyde resin; and about 1 to 45 percent by weight of a sensible material.

26 Claims, No Drawings

COATED TRANSFER MEDIUM FOR PRODUCING SCRATCH AND SMUDGE RESISTANT MARKS

BACKGROUND OF THE INVENTION

This invention relates to transfer media and to a process for making the same. More particularly, this invention relates to transfer media, having transferable coating compositions thereon, which are suitable for applications requiring transfer of the coating composition from the transfer medium to a recording medium. Transfer pressure is applied by means of pressure or by means of pressure and heat such as the impact of type or pressure from other marking instruments in selected areas, either to the back of a transfer medium which has a transferable coating composition thereon or to the back of a recording medium to cause breakaway of the coating composition from the transfer medium and adherence of such broken-away coating composition to the recording medium.

Transfer media such as carbon paper and typewriter ribbons have, of course, been known and used for many years. Lately, however, the placing of various types of printed marks on recording media to be handled and sensed by data-processing equipment has become a matter of increasing interest and special transfer sheets and printing ribbons have been developed to meet the requirements of such data-processing equipment.

One of the greatest problems encountered with marks printed on recording media is the great tendency for the printed marks to scratch or smudge. The marks printed on the recording medium usually become scratched or smudged when the printed medium is passed through ordinary commercial transactions and when the printed medium is passed through data-processing equipment. This problem of scratching and smudging is encountered even with some of the most recently developed transfer media. When this scratching or smudging occurs, the reliability with which the true mark can be automatically sensed is severely impaired even though the impairment may sometimes be comparatively slight by visual standards.

The present invention provides a transfer medium which is capable of producing suitable printed marks on a recording medium which have sufficient resistance to scratching and smudging when the printed medium is passed through ordinary commercial transactions and when the printed medium is processed through data-processing equipment so that the printed marks do not sustain any change sufficient to affect the accuracy of the sensing operation.

The present invention provides transfer media, having colored transferable coating compositions thereon, which may be used in the printing of colored code bars on recording media such as paperboard marking tags used by merchandising institutions to identify inventory. Such color-coded tags have resulted in a major breakthrough in machine-readable media technology. In a typical system, white paperboard tags are printed with font which is readable by humans and are encoded or printed with different colored bars by a color-coded tag printer which are readable by an optical scanning device known as a color-coded tag reader. The colored printed bars may be separated thereby allowing the white background of the paper to form a third colored bar. The tag itself offers many business system advantages which include attachment methods, base stock variety, information capacity and flexibility. The color-coded tag serves as a medium to transfer data between the color-coded tag printer, which encodes data contained in a source document onto the tag, and the color-coded tag reader which enters the color-coded data into the business system usually at the point of sale. The color-coded tag reader utilizes optical scanning to sense and distinguish the different colored bars which have been encoded on the tag by the tag printer in a binary pattern and to convey the encoded information contained in the bars to the business system.

In a color-coded tag system as described above, it is very important that the different colored bars which are encoded on the tag have a high resistance to scratching and smudging so that the information contained in the bars can be correctly read by the optical scanning device of the color-coded tag reader.

The present invention also provides transfer media, having transferable coating compositions, which may be used in the encoding or printing of paper records, such as checks, bank deposit slips, credit charge slips and the like with magnetic symbols which can be recognized by electronic accounting equipment or which may be used as one-time carbon ribbons or papers.

It will be readily apparent that the principles of the present invention can be applied whether the transfer medium is arranged to deposit marks suitable for sensing visually, by optical means, by photoelectric means, by magnetic means, by electroconductive means, or by any other means sensitive to a special material in the coating.

PRIOR ART

The present invention comprises a transfer medium having a transferable coating composition thereon, which comprises an olefinic polymer, a wax, an aminotriazine-sulfonamide-formaldehyde resin and a sensible material. The transfer medium of the present invention produces encoded or printed marks on a recording medium which possess excellent scratch and smudge resistant properties.

The most pertinent prior art is found in the following patents which disclose transfer media which produce printed marks on recording media by means of pressure such as the impact of type or pressure from other marking instruments. U.S. Pat. No. 2,984,582 discloses a transfer medium having a porous, thermoplastic resin layer containing a transferable ink. The ink is released by the resin layer onto a recording medium without transfer of the resin layer onto the recording medium. U.S. Pat. Nos. 2,671,734; 2,822,288; 3,337,361 and 3,340,086 disclose transfer media which produce encoded or printed marks on a recording medium. None of these patents disclose the transfer medium having the transfer coating composition of the present invention. U.S. Pat. No. 3,062,676 discloses a transfer medium having a coating composition which is formed of a plurality of coatings. The coatings are transferred to a recording medium thereby producing encoded or printed marks on the medium which possess good smudge-resistant properties. U.S. Pat. No. 3,087,832 discloses a transfer medium having a coating composition which comprises a magnetic pigment mixed in a silicone resin and a silicone rubber binder system. The coating composition has a top coating of wax which aids in the adherence of the magnetic transfer coating to a recording medium upon transfer thereto. U.S. Pat. No. 3,375,125 discloses a transfer medium having a coating composition which comprises ethyl cellulose, a resin binder, mineral oil, a wax and a pigment. The coating composition is transferred to a recording medium thereby producing encoded or printed marks on the recording medium which possess good smudge-resistant properties.

The prior art does not disclose the novel transfer medium of the present invention which produces encoded or printed marks on a recording medium possessing excellent scratch and smudge resistant properties.

SUMMARY OF THE INVENTION

In accordance with the present invention, there is provided a transfer medium comprising a base having a transferable coating composition thereon, said coating composition comprising about 3 to 40, preferably about 15 to 25, percent by weight of an olefinic polymer which can be a homopolymer of ethylene, a copolymer of ethylene and a vinyl ester containing four to about six carbon atoms, a copolymer of ethylene and a lower alkyl acrylate, a copolymer of ethylene and a lower alkyl methacrylate; a copolymer of ethylene and acrylic acid, a copolymer of ethylene and methacrylic acid, a copolymer of ethylene and propylene, a homopolymer of propylene or a mixture thereof; about 3 to 40, preferably about 15 to 25, percent by weight of a wax having a melting point of about 150° to 220°, preferably about 180° to 200° F.; about 15 to 70, preferably about 50 to 65 percent by weight of a thermoplastic aminotriazine-sulfonamide-aldehyde resin; and about 1 to 45, preferable about 2 to 20 percent by weight of a sensible material. The above percents by weight are based on the total weight of the transferable coating composition.

In further accordance with the present invention, the transfer medium of the present invention is produced by a process which comprises applying the above-named components of the coating composition to a suitable base by means of a volatile organic solvent carrier. The solvented coating composition is spread uniformly over the base and the volatile organic solvent carrier is then allowed to evaporate thereby leading a transferable coating composition deposited on the base.

DETAILED DESCRIPTION OF THE INVENTION

The olefinic polymer used in the present invention can be a homopolymer of ethylene having a molecular weight of about 1,500 to 12,000, preferably about 2,000 to 8,000. The olefinic polymer can also be a copolymer of ethylene and a vinyl ester containing four to about six carbon atoms. The copolymer has a vinyl ester content of about 3 to 50, preferably about 5 to 35, percent by weight based upon the total weight of the copolymer and a molecular weight of about 1,500 to 12,000, preferably about 2,000 to 8,000. Suitable copolymers include copolymers of ethylene and vinyl acetate, ethylene and vinyl propionate, and ethylene and vinyl butyrate. The olefinic polymer also can be a copolymer of ethylene and a lower alkyl acrylate wherein the lower alkyl radical contains one to about four carbon atoms. The copolymer has a lower alkyl acrylate content of about 3 to 50, preferably about 5 to 35, percent by weight based upon the total weight of the copolymer and a molecular weight of about 1,500 to 12,000, preferably about 2,000 to 8,000. Suitable copolymers include copolymers of ethylene and methyl acrylate, ethylene and ethyl acrylate, ethylene and propyl acrylate, and ethylene and butyl acrylate. The olefinic polymer also can be a copolymer of ethylene and a lower alkyl methacrylate wherein the lower alkyl radical contains one to about four carbon atoms. The copolymer has a lower alkyl methacrylate content of about 3 to 50, preferably about 5 to 35, percent by weight based upon the total weight of the copolymer and a molecular weight of about 1,500 to 12,000, preferably about 2,000 to 8,000. Suitable copolymers include copolymers of ethylene and methyl methacrylate, ethylene and ethyl methacrylate, ethylene and propyl methacrylate, and ethylene and butyl methacrylate. The olefinic polymer also can be a copolymer of ethylene and acrylic acid. The copolymer has an acrylic acid content of about 3 to 50, preferably about 5 to 35, percent by weight based upon the total weight of the copolymer and a molecular weight of about 1,500 to 12,000, preferably about 2,000 to 8,000. The olefinic polymer also can be a copolymer of ethylene and methacrylic acid. The copolymer has a methacrylic acid content of about 3 to 50, preferably about 5 to 35, percent by weight based upon the total weight of the copolymer and a molecular weight of about 1,500 to 12,000, preferably about 2,000 to 8,000. The olefinic polymer also can be a copolymer of ethylene and propylene. The copolymer has a propylene content of about 3 to 97, preferably about 5 to 95, percent by weight based upon the total weight of the copolymer and a molecular weight of about 1,500 to 12,000, preferably about 2,000 to 8,000. The olefinic polymer also can be a homopolymer of propylene having a molecular weight of about 1,500 to 12,000, preferably about 2,000 to 8,000.

The wax used in the present invention is a wax having a melting point ranging between about 150° to 220°, preferably about 180° to 200° F. as determined by ASTM D-127. Suitable waxes include natural waxes such as carnauba, montan and the like and mixtures thereof; synthetic waxes such as hydrogenated, amide, chlorinated, alkene or olefinic, miscellaneous and the like and mixtures thereof; and petroleum waxes such as microcrystalline, paraffin and the like and mixtures thereof.

The term wax, as used herein, defines a class of waxes which is characterized by a particular degree of hardness as determined by a needle penetration test ASTM D-1321. The needle penetration test measures the depth to which a weighted needle penetrates a sample of wax. In the needle penetration test, a wax sample is melted by heating it to about 30° F. above its melting point and is then solidified by cooling to 77° F. The hardness of the wax is measured with a penetrometer whereby a standard needle, under a load of 100 grams, is applied to the wax sample for 5 seconds. The depth to which the needle penetrates the wax during the 5-second time interval is measured in 10ths of a millimeter. If the needle penetrates the wax to a depth of 0.2 millimeter, the hardness rating of the wax is 2. If the needle penetrates the wax to a depth of 0.8 millimeter, the rating of the wax is 8, and so forth. The waxes which can be used according to this invention are those which have a rating from about 0.5 to 10, preferably about 1 to 9. The wax can be an animal, mineral, petroleum, synthetic or vegetable wax or a mixture thereof so long as the wax is stable, can be solvable, has the required degree of hardness and has the above indicated melting point range.

In certain cases, where the properties of the olefinic polymer and the wax are contained within the above-defined parameters, the olefinic polymer and the wax can be of the same material.

The thermoplastic aminotriazine-sulfonamide-aldehyde resin used in the present invention is a cocondensation product of a cyclic aminotriazine, an aromatic monosulfonamide and an aldehyde such as formaldehyde. The thermoplastic resin should preferably be completely condensed.

The thermoplastic aminotriazine-sulfonamide-aldehyde resin may be prepared from an aromatic monosulfonamide having two reactive amide hydrogens, a cyclic aminotriazine having at least two primary amino groups and an aldehyde such as formaldehyde or paraformaldehyde. If desired, either or both of the first-mentioned components may be separately reacted with the aldehyde to form a thermoplastic sulfonamide-aldehyde resin or a B-stage partially condensed aminotriazine-aldehyde resin, respectively, before being cocondensed. The aromatic sulfonamide may comprise toluene sulfonamide, for example, ortho- or para-toluene sulfonamide or mixtures thereof, benzene sulfonamides, or the alkyl derivatives of such sulfonamides, and the like, in which the sulfonamido group is attached directly to the aromatic nucleus through the sulfur atom.

The cyclic aminotriazine compound may comprise a compound having at least two amino groups as represented by the following formula:

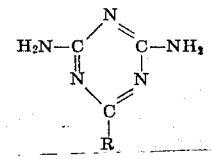

wherein R is hydrogen, alkyl containing one to about eight carbon atoms, aryl, aralkyl, amino, and the like.

The following are typical aminotriazine compounds within the above formula:
2,4-diamino-1,3,5-triazine
2,methyl-4,6-diamino-1,3,5-triazine
2(3-hydroxy butyl)-4,6-diamino-1,3,5-triazine
2-heptyl-4,6-diamino-1,3,5-triazine
2-phenyl-4,6-diamino-1,3,5-triazine
2-benzyl-4,6-diamino-1,3,5-triazine
2,4,6-triamino-1,3,5-triazine (melamine)

In place of melamine as the aminotriazine compound, one can use methyl melamine or other alkyl derivatives of melamine, that is, N-alkyl melamines, such as the mono- or dialkyl derivatives where the alkyl group may be methyl, ethyl, propyl, butyl, and the like, up to about eight carbon atoms.

Also, the B-stage methylol aminotriazine resin can be modified by forming the alkyl ether of the methylol aminotriazine. For example, this can be done by taking an A-stage methylol aminotriazine, that is, the tri-, tetra- or pentamethylol aminotriazine, and then converting to the B-stage resin in the presence of an alkanol such as methanol, ethanol, propanol, butanol, and similar alkanols containing up to about eight carbon atoms. When using methanol, the resin would be the mono- or dimethyl ether of tri-, tetra- or pentamethylol aminotriazine, in partially condensed form. Also, alkanol derivatives of the aminotriazine in which the alkyl group contains more than about three carbon atoms may be formed during the course of the cocondensation reaction by introducing the aminotriazine in a solution of an alcohol such as butanol. It will be noted that the aminotriazine reacts as an amide rather than as an amine.

The relative quantities of the materials to be cocondensed are critical only to the extent that sufficient aldehyde should be used to produce a completely condensed product; if too large a quantity of the aminotriazine is used, the final product will be a thermosetting product, which is not desired; and if too small a quantity of the aminotriazine is used, the softening point of the product will differ only slightly from the softening point of the sulfonamide-formaldehyde resin and may not have insolubility in the desired solvents. Also, the amount of the sulfonamide is dependent upon the number of primary amino groups in the aminotriazine. For example, it is preferred to use about three times (on a molar basis) as much of the sulfonamide as the aminotriazine when the aminotriazine contains two amino groups, and about five times (on a molar basis) as much sulfonamide when the aminotriazine contains three amino groups. In other words, the aminotriazine or B-stage aldehyde-aminotriazine resin is preferably from about 20 to 33 mol percent of the amount of the monosulfonamide or the aldehyde-monosulfonamide resin, although the former may be as great as about 50 mol percent and as little as about 17 mol percent of the latter.

Generally, when preparing the alkanol modified resin, it is necessary to use additional quantities of formaldehyde over and above that required for the alkanol modification so as to provide for subsequent cocondensation with the sulfonamide-formaldehyde resin. The B-stage aminotriazine-formaldehyde resin, that is, the methylol aminotriazine, must have at least two methylol groups and preferably three such groups in order to successfully carry out the subsequent cocondensation with the sulfonamide resin.

The thermoplastic resin may be prepared using as reactants either formaldehyde or its polymer, paraformaldehyde, which polymer has the general formula

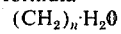$(CH_2)_n \cdot H_2O$ where $n$ is 6 or greater. This monomer and its polymer should be distinguished from polyaldehydes such as glyoxal containing a plurality of aldehyde groups in a stable molecule.

Typical modes of preparation of the thermoplastic aminotriazine-sulfonamide-aldehyde resin used in the present invention are found in U.S. Pat. No. 2,938,873 in examples 1 through 25. These examples are incorporated herein as a part of this specification.

In a preferred embodiment, the thermoplastic aminotriazine-sulfonamide-aldehyde resin is a cocondensation product of a melamine, an aromatic sulfonamide and an aldehyde such as formaldehyde. The thermoplastic resin should preferably be completely condensed. The thermoplastic melamine-sulfonamide-aldehyde resin may be prepared from an aromatic mono-sulfonamide having two reactive hydrogens, that is, two reactive amide hydrogens, a melamine or a melamine derivative having at least two functional amide groups and formaldehyde or paraformaldehyde. If desired, either or both of the first-mentioned components may be separately reacted with formaldehyde to form a thermoplastic sulfonamide-aldehyde resin or a B-stage partially condensed melamine-aldehyde resin, respectively, before being cocondensed. The aromatic sulfonamide may comprise a mixture of ortho- and para-toluene sulfonamides, benzene sulfonamide or the alkyl derivative thereof or a toluene sulfonamide wherein the sulfonamido group is attached directly to the aromatic nucleus through the sulfur atom.

The B-stage partially condensed melamine-aldehyde resin (methylol melamine resin) is the water-soluble, thermofusible reaction product of melamine and formaldehyde or paraformaldehyde. In place of melamine, one can use the methyl melamine or other alkyl derivatives of melamine such as the mono- or dialkyl derivatives where the alkyl group may be methyl, ethyl, propyl, butyl or the like.

Also, the B-stage melamine-aldehyde resin can be modified by forming the alkyl ether of the melamine-aldehyde resin. This can be done by taking an A-stage melamine-aldehyde resin, that is, the tri-, tetra- or pentamethylol melamine resin, and then converting it to the B-stage resin in the presence of an alkanol such as methanol, ethanol, propanol, butanol or the like. When using methanol, the modified B-stage resin would be the mono-, di- or trimethyl ether of tri-, tetra- or pentamethylol melamine in partially condensed form.

The relative quantities of the materials to be cocondensed are critical only to the extent that more than about 20 percent by weight of the unmodified melamine-aldehyde B-stage resin in the final product will produce a thermosetting product, which is not desired, and, if too small a quantity of the melamine resin is used, the softening point of the product will differ only slightly from the softening point of the aromatic sulfonamide-aldehyde resin. In other words, the amount by weight of the sulfonamide-aldehyde resin should be at least four times the amount of the unmodified B-stage melamine-aldehyde resin. When the unmodified melamine-aldehyde B-stage resin is employed, it is preferred to use about 16 percent thereof based on the weight of the final cocondensed resin, that is, about five times as much of the sulfonamide-aldehyde resin as the unmodified B-stage melamine-aldehyde resin. When the melamine derivatives or the modified B-stage melamine resins are used, greater relative quantities can be employed up to about 25 to 35 percent by weight of the final product, that is, up to about 50 percent by weight of the sulfonamide-aldehyde resin. Generally, when employing a melamine derivative to form the B-stage partially condensed resin or when preparing the alkanol modified melamine resin, it is desirable to use greater quantities of the aldehyde so as to provide additional methylol groups for subsequent cocondensation with the sulfonamide-aldehyde resin. The B-stage melamine-aldehyde resin, that is, the methylol melamine resin, must have at least two methylol groups and preferably three or four such groups in order to successfully carry out the subsequent cocondensation with the sulfonamide resin.

The various melamine derivatives having at least two functional amide groups, which are useful substitutes for melamine for the purposes of the present invention, include all of such derivatives mentioned in the foregoing discussion. Stated most simply, by way of summary, they include alkyl melamines having preferably no more than one alkyl substituted amido nitrogen and monohydric alkanol modified methylol and alkyl methylol melamines.

The melamine-sulfonamide-aldehyde resin can be prepared using either formaldehyde or its polymer, paraformaldehyde, as reactants. This monomer and its polymer, wherein the same atoms are present in the same proportion, should be distinguished from isomerides of formaldehyde such diformaldehyde which contains a plurality of aldehyde groups in a stable molecule.

Typical modes of preparation of the thermoplastic melamine-sulfonamide-aldehyde resin used in the present invention are found in U.S. Pat. No. 2,809,954, in examples 1 through 15. These examples are incorporated herein as a part of this specification.

The aminotriazine-sulfonamide-aldehyde resin has a higher softening point than the well-known sulfonamide-aldehyde resins and has some characteristics which are in no way similar to the completely condensed aminotriazine-aldehyde resins and other characteristics which are in no way similar to the thermoplastic sulfonamide-aldehyde resins. The aminotriazine-sulfonamide-aldehyde resin not only has a higher melting point than the sulfonamide-aldehyde resins, but it will release solvents more rapidly than such resins and does not exhibit cold flow at room temperature as do the sulfonamide-aldehyde resins. On the other hand, the aminotriazine-sulfonamideealdehyde resin, unlike the aminotriazine-aldehyde resin, is soluble in certain solvents and is thermoplastic. The overall character of the aminotriazine-sulfonamide-aldehyde resin makes it especially suitable for the manufacture of pigments. For example, the aminotriazine-sulfonamide-aldehyde resin can be highly colored and, even though thermoplastic, can be readily ground to a finely divided condition at temperatures below about 100° C. Most thermoplastic resins will either soften at the temperatures encountered during grinding or will tend to ball up or agglomerate, even at temperatures below the softening point, probably due to cold flow under the pressure of the grinding elements. The aminotriazine-sulfonamide-aldehyde resin is brittle and friable below its softening point and is not hornlike and tough as are most thermosetting resins. The aminotriazine-sulfonamide-aldehyde resin is insoluble in many common vehicles and can therefore be suspended in such vehicles without coalescence or agglomeration.

The sensible material used in the present invention can be any material which is capable of being sensed visually, by optical means, by photoelectric means, by magnetic means by electroconductive means or by any other means sensitive to the sensible material. The sensible material can be an inorganic or organic material such as a coloring material, namely, a dye or a pigment, a magnetic material or any other material capable of being sensed and which is compatible with the coating composition.

Suitable sensible materials include phthalocyanine dyes such as Monastral Green B (color index no. 74,260), Monastral Green G (color index no. 74,260), Sherwood Green (color index no. 42,000) and Tropical Brilliant Green (color index no. 42,040); fluorescent rhodamine or xanthene dyes such as rhodamine B Extra (color index no. 45,170), rhodamine GDN Extra (color index no. 45,160), xylene red (color index no. 45,100), rhodamine 5G (color index 45,105), rhodamine G (color index no. 45,150), and rhodamine 2B (color index no. 45,151); fluorescent naphthalimide dyes such as brilliant yellow 6G (color index no. 29,000) which has the formula 4 amino 1,8 naphthal 2',4' dimethyl phenylimide, other fluorescent naphthalimide dyes such as (4n-butyl-amino) 1,8 naphthal n-butyl imide and 4 amino 1,8 naphthal p-xenyl imide; other dyes or pigments such as malachite green (color index no. 42,000); cadmium primrose (color index no. 77,199), chrome yellow (color index no. 77,600), Ultramarine Blue (color index no. 77,007), Phthalocyanine Blue (color index no. 74,160), Lake Red C (color index no. 15,585), Sodium Lithol Red (color index no. 15,630), titanium dioxide and zinc oxide; magnetic metal oxides such as iron oxide, cobalt oxide and nickel oxide; finely divided metals and alloys such as bronze, stainless steel, iron, cobalt, nickel and chrome; and miscellaneous coloring materials such as carbon black, conductive carbon and charcoal.

As an example of a sensible material which is not normally visible, but can be detected, a small amount of a material such as 4-methyl-7-diethylamino coumarin will not color a coating composition when it is exposed to ordinary light but will produce a bright blue color when the coating composition is exposed to ultraviolet light.

The sensible material can include any luminescent, fluorescent or phosphorescent material, either organic or inorganic, or any materials which are partially visible or substantially invisible, in normal or ordinary light, and which become visible or emit energy when exposed to light or energy differing in kind or wavelength from that emitted by the luminescent material. The term luminescent material is intended to include and denote both fluorescent materials, which are activated by energy of shorter wavelength and emit energy of longer wavelength, and phosphorescent materials which continue to emit light or energy after excitation is discontinued.

The above-named sensible materials constitute only a fraction of the many different sensible materials that can be used in the present invention and are not to be construed as limiting the scope of the suitable sensible materials that can be used in the present invention. Any of the above-named sensible materials can be used alone or in combination with each other or in combination with other suitable sensible materials not specifically named above. The sensible material need only be suitable for the sensing required, have a high resistance to scratching an smudging when the coating composition is transferred onto the recording medium and be compatible with the coating composition.

The sensible material can be chosen so that the transferred coating composition will reflect a certain amount of light within a particular wavelength. For example, a black sensible material can be chosen so that the transferred coating composition has a diffused reflectance of less than 15 percent of light between a wavelength of 600 and 1,200 nanometers and a green sensible material can be chosen so that the transferred coating composition has a diffused reflectance of less than 15 percent of light between a wavelength of 600 and 750 nanometers, 50 percent of light between a wavelength of about 820 and 870 nanometers, and greater than 80 percent of light between a wavelength of 900 and 1,200 nanometers. The wavelength of light between 600 and 1,200 nanometers is within the visible and the near infrared spectrum. The choosing of a sensible material for such optical properties is useful in an optical sensing device.

The transferable coating composition can contain small amounts of certain additives to accomplish a particular desired effect. For example, a small amount of polysiloxane rubber gum present in the coating composition will aid in releasing the transferable coating composition from the base. Likewise, the base can be specially treated with certain materials to accomplish a particular desired effect. Finally, the surface of the coating composition can be coated with certain materials to accomplish a particular desired effect. For example, sometimes a thin wax coating will aid in adherence of the coating composition to the recording medium.

The base to which the transferable coating composition is applied can be a thin material such as a film, web, sheet, ribbon, fabric or the like. The preferred base is a film of polyethylene terephthalate, however, other bases can be used. For example, cellulosic materials, cellophane, nylon, rubber hydrochloride, polyethylene, polypropylene and the like are acceptable bases when used in the form of a film, web, sheet, ribbon, fabric or the like. The base should have a thickness of about 0.2 to 2, preferably of about 0.3 to 0.8 mils. The base should be such that the transferable coating composition adheres to the base in a proper manner prior to transfer of the coating composition to the recording medium and the transferable coating composition is released from the base in a proper manner upon transfer. The base should be limited in thickness to permit a full realization of the capability of the transferable coating composition to deposit marks having sharp, clear edge definition on a recording medium. The base should also possess uniform tensile and other physical properties to insure uniform transfer of the coating composition onto a recording medium.

The transferable coating composition can e applied to the base in the following manner to produce the transfer medium of the present invention. The olefinic polymer and the wax can be heated in about one half of the volatile organic solvent carrier to a temperature near or above the melting point of the wax, for example, to a temperature ranging from about 150° to 220°, preferably about 170° to 200° F., with constant stirring until a composition having a uniform consistency is obtained. The composition can then be added to the remainder of the volatile organic solvent and the composition can then be cooled fairly rapidly to about room temperature under high-shear agitation until a composition having a uniform consistency is obtained. In an alternate procedure, the olefinic polymer and the wax can be heated to the above temperature ranges and solvented. The aminotriazine-sulfonamide-aldehyde resin and the sensible material can then be added to the composition comprising the olefinic polymer, the wax and the volatile organic solvent with constant stirring until a composition having a uniform consistency is obtained. About 500 to 100, preferably about 300 to 150 parts of organic solvent is usually used per 100 parts of olefinic polymer, wax, aminotriazine-sulfonamide-aldehyde resin and sensible material used. However, the ratio of solvent to the aforementioned components is usually not particularly critical. It is preferred that the aminotriazine-sulfonamide-aldehyde resin be insoluble or at most only partially soluble in the volatile organic solvent so that the aminotriazine-sulfonamide-aldehyde resin is dispersed in the solvented coating composition. The solvented coating composition is then milled until the composition is homogeneous and the particle size of the aminotriazine-sulfonamide-aldehyde resin is reduced to about 3 microns. The sensible material can be added separately to the coating composition or the sensible material can be mixed, dispersed or dissolved in the aminotriazine-sulfonamide-aldehyde resin and then added to the coating composition. The sensible material can be added to the aminotriazine-sulfonamide-aldehyde resin during its production or after its production. Specific details for adding the sensible material to the resin are contained in U.S. Pat. No. 2,809,954 in examples 6 through 15 and in U.S. Pat. No. 2,938,873 in examples 9 through 25. These examples are incorporated herein as a part of this specification.

In some cases heating can even be eliminated and the components can be milled and mixed to produce the solvented coating composition.

The transferable coating composition can be applied to the base by roll coating, knife coating or by a similar means. The volatile organic solvent can be evaporated at ambient temperature or can be evaporated by the application of gentle heat thereby leaving a transferable coating composition having a thickness of about 0.2 to 0.6, preferably about 0.3 to 0.4 mils deposited on the base.

Suitable volatile organic solvent carriers for the coating composition include aliphatic and aromatic hydrocarbon solvents such as mineral spirits, naphtha, xylene, toluene and mixtures thereof. Other suitable organic solvents include isopropyl alcohol, isobutyl alcohol, 3-heptanol, isoamyl acetate, ethyl amyl ketone, diisobutyl ketone, carbon tetrachloride, carbon disulfide and mixtures thereof. The olefinic polymer and the wax should be soluble or at least partially soluble in the volatile organic solvent so that there is a comingling of the olefinic polymer and the wax. One of the above suggested solvents or a mixture thereof can be selected with this criteria in mind.

The above process for producing the transfer medium of the present invention is only illustrative and can be varied within reasonable limits to produce the transfer medium of the present invention.

PREFERRED EMBODIMENTS

The following Examples illustrate the present invention and modes of carrying out the invention.

EXAMPLE 1

A typical thermoplastic aminotriazine-sulfonamide-aldehyde resin is prepared in the following manner. three hundred and sixty parts by weight of a mixture of ortho- and para-toluene sulfonamide-formaldehyde resins are melted at a temperature of 60° to 70° C. and are then heated to a temperature of 125° C. At this temperature, 78.4 parts by weight of B-stage unmodified melamine-formaldehyde resin are added and dissolved therein and heating is continued. The reaction mixture becomes clear at a temperature of about 150° C. and heating is continued up to a temperature of 170° C. and held there for about 10 minutes. Upon cooling, the cocondensed resin begins to solidify at a temperature of about 115° C. The completely condensed product is a clear water-white resin which, below a temperature of about 100° C., is brittle, friable and is easily ground in a micropulverizer or by wet ball milling into a finely divided powder having a particle size of about 4 microns. The completely condensed resin has a softening point at a temperature of about 115° C. Thermoplastic aminotriazine-sulfonamide-aldehyde resins having substantially the same physical properties as the above prepared resin are prepared in accordance with examples 2 through 6 of U.S. Pat. NO. 2,809,954 and examples 2 through 9 of U.S. Pat. No. 2,938,873. These examples are incorporated herein as a part of this specification.

A sensible material is incorporated in any of the foregoing clear resins having substantially the same physical properties when the reaction mixture reaches a temperature of between 150° and 160° C. while the reaction mixture is heated up to a temperature of between 170° to 180° C. or by melting the finished resin at a temperature between 130° to 160° C. and adding the sensible material to the melt, solidifying and regrinding the resin. Where applicable, the solidified resin and the sensible material may be dissolved in a ketone or an ester solvent, the solvent evaporated and the composition of sensible material and resin then ground to a fine powder. About 1 to 50 parts by weight of the sensible material is added to 100 parts by weight of the resin depending upon the properties desired in the coating composition of the transfer medium.

EXAMPLE 2

Green and black transfer media, that is, printing ribbons, were prepared in the following manner using solvented coating compositions described below.

Solvented Coating Compositions

| Component | Parts by Weight Green Composition | Parts by Weight Black Composition |
|---|---|---|
| Copolymer of Ethylene and Vinyl Acetate—AC-400 (1) | 7 | 7 |
| Modified Microcrystalline Wax—WB-2 (2) | 6 | 6 |
| Melamine-Sulfonamide-Formaldehyde Resin Containing a Fluorescent Blue Dye and a Phthalocyanine Blue Toner— A-19 (3) | 11 | 13 |
| Melamine-Sulfonamide-Formaldehyde Resin Containing a Fluorescent Green Dye and a Phthalocyanine Green Toner— A-18 (4) | 8 | — |
| Monastral Green B Phthalocyanine Polychloro Copper Toner—Color Index No. 74260 (5) | 1 | — |
| Black Magnetic Iron Oxide MO-4232 (6) | — | 7 |
| Toluene | 67 | 67 |
| Total | 100 | 100 |

(1) Marketed by Allied Chemical Corporation, New York, N.Y., U.S.A. under the trade designation of AC-400. This copolymer contains about 13 to 16 percent by weight of vinyl acetate and has a molecular weight of about 3,500.

(2) Marketed by Bareco Division of Petrolite Corporation, Tulsa, Okla., U.S.A. under the trade designation of WB-2. The modified microcrystalline wax has an acid number of 23 to 30 (ASTM D-1,386), a saponification number of 70 to 86 (ASTM D-1,387), a needle penetration of 3 to 5 (ASTM D-1,321) and a minimum melting point of 180° F. (ASTM D-127).

(3) Marketed by the Day-Glo Color Corp., Cleveland, Ohio U.S.A. under the trademark of DAY-GLO Fluorescent Pigment Horizon Blue A-19. This material comprises about 96 percent by weight of a thermoplastic melamine-sulfonamide-formaldehyde resin prepared in accordance with example 1, about 3 percent by weight of a daylight fluorescent blue dye and about 1 percent by weight of a phthalocyanine blue toner. This material has a minimum luminance factor of 17 percent, a minimum purity of 65 percent and a dominant wavelength of 475 to 480 millimicrons or nanometers determined in accordance with the daylight fluorescent color specification system described on pages 23 through 25 of the Day-Glo Color Corp. Technical Booklet No. 1,170-A.

(4) Marketed by the Day-Glo Color Corp., Cleveland, Ohio, U.S.A. under the trademark of DAY-GLO Fluorescent Pigment Signal Green A-18. This material comprises about 96 percent by weight of a thermoplastic melamine-sulfonamideformaldehyde resin prepared in accordance with example 1, about 3 percent by weight of a daylight fluorescent green dye and about 1 percent by weight of a phthalocyanine green toner. This material has a minimum luminance factor of 55 percent, a minimum purity of 65 percent and a dominant wavelength of 540 to 547 millimicrons or nanometers determined in accordance with the daylight fluorescent color specification system described on pages 23 through 25 of the Day-Glo Color Corp. Technical Booklet No. 1,170-A.

(5) Marketed by E. I. du Pont de Nemours & Co., Inc., Wilmington, Del., U.S.A.

(6) Marketed by Charles Pfizer & Co., New York, N.Y., U.S.A. under the trade designation of MO-4,232.

Each of the above solvented coating compositions were prepared by heating the copolymer of ethylene and vinyl acetate, the modified microcrystalline wax and about one-half of the toluene in a 500 ml. Erlenmeyer flask with constant stirring to a temperature of 180° F. thereby forming a composition having a uniform consistency. Heating was carried out on a conventional hot plate. The flask was then removed from the heat and the composition was quickly cooled to room temperature by adding the composition to the remainder of the toluene and cooling the flask in a water bath. The composition was subjected to high-shear agitation while it was cooled thereby forming a composition having a uniform consistency. The melamine-sulfonamide-formaldehyde resin and the sensible material were then added to the composition with constant stirring thereby forming a coating composition having a uniform consistency. The coating composition was then ball milled in a 150 ml. stainless steel container containing 40 ml. of ⅛ inch stainless steel balls until the particle size of the melamine-sulfonamide-formaldehyde resin was about 3 microns. Milling was performed on a paint shaker.

Each solvented coating composition was then coated onto a 0.35-mil polyethylene terephthalate film and was uniformly spread over the film using a wire-wound rod to a coverage of about 18 milligrams of solvented coating composition per square inch of film. The toluene was allowed to evaporate at room temperature thereby leaving a dried transferable coating composition having a thickness of about 0.3 to 0.4 mil on the film. The coated film was then cut into printing ribbons.

The green and black printing ribbons were then placed in an NCR Class Color Bar Code System Tag and Label Printer manufactured by The National Cash Register Company, Dayton, Ohio, U.S.A. The Tag and Label Printer printed a sequence of green nd black bars on white paper labels. These green and black printed bars contain binary bits of encoded information that are read by an optical detection system wherein the spectral properties of the green and black printed bars and the white spaces of the paper label between the colored bars activate a sensing device. The sensing device is activated by passing an optical probe tip over the printed bars; therefore, the printed bars must possess a clear edge definition and have a high resistance to scratching and smudging in order for the encoded information contained in the bars to be properly read. Such a printing and optical scanning system is disclosed in U.S. patent applications Ser. No. 837,514 filed June 30, 1969, and Ser. No. 837,850 filed June 30, 1969.

The green and black bars printed on the labels were tested for resistance to scratching and smudging using a Gardner Laboratory Scratch Tester. A standard color bar code system probe tip used in the optical system under 500 grams of weight and perpendicular to the plane of the printed bars was contacted with and passed over the printed bars ten times. The standard probe tip was a color bar code system optical probe tip. The printed bars possessed excellent resistance to scratching and smudging upon visual examination. The optical probe tip was then passed over the printed bars and there was only a slight decrease in the readability of the encoded information by the optical detection system.

In this example, the printed black bars had a diffused reflectance of less than 15 percent of light between a wavelength of 600 and 1,200 nanometers and the printed green bars had a diffused reflectance of less than 15 percent of light between a wavelength of 600 and 750 nanometers, 50 percent of light between a wavelength of about 820 and 870 nanometers and greater than 80 percent of light between a wavelength of 900 and 1,200 nanometers. The white paper label had a diffused reflectance of more than 80 percent of light between a wavelength of 600 and 1,200 nanometers.

EXAMPLE 3

Green and black transfer media, that is, printing ribbons, were prepared in accordance with the procedures set forth in example 2 using solvented coating compositions described below.

Solvented Coating Compositions

| Component | Parts by Weight Green Composition | Parts by Weight Black Composition |
|---|---|---|
| Homopolymer of Ethylene— AC-6 (7) | 7 | 7 |
| Modified Microcrystalline Wax—WB-2 (2) | 6 | 6 |
| Melamine-Sulfonamide-Formaldehyde Resin Containing a Fluorescent Blue Dye and a Phthalocyanine Blue Toner— A-19 (3) | 11 | 13 |
| Melamine-Sulfonamide-Formaldehyde Resin Containing a Fluorescent Green Dye and a Phthalocyanine Green Toner— A-18 (4) | 8 | — |
| Monastral Green B Polychloro Copper Phthalocyanine Toner— Color Index No. 74260 (5) | 1 | — |
| Black Magnetic Iron Oxide— MO-4232 (6) | — | 7 |
| Toluene | 67 | 67 |
| Total | 100 | 100 |

(2) through (6)—See example 2.

(7) Marketed by Allied Chemical Corporation, New York, N.Y., U.S.A. under the trade designation of AC-6. This homopolymer has a molecular weight of about 2,000.

The green and black printing ribbons were evaluated for print quality and resistance to scratching and smudging in accordance with the procedures set forth in example 2. The printed bars possessed excellent resistance to scratching and smudging upon visual examination and optical scanning.

This example illustrates that a homopolymer of ethylene can be used in place of the copolymer of ethylene and vinyl acetate.

EXAMPLE 4

Green and black transfer media, that is, printing ribbons, were prepared in accordance with the procedures set forth in example 2, using solvented coating compositions described below.

Solvented Coating Compositions

| Component | Parts by Weight Green Composition | Parts by Weight Black Composition |
|---|---|---|
| Copolymer of Ethylene and Acrylic Acid—AC-540 (8) | 4 | 4 |
| Homopolymer of Ethylene— AC-1702 (9) | 2 | 2 |
| Modified Microcrystalline Wax— WB-2 (2) | 4 | 4 |
| Paraffin Wax—5512 (10) | 3 | 3 |
| Melamine-Sulfonamide-Formaldehyde Resin Containing a Fluorescent Blue Dye and a Phthalocyanine Blue Toner— A-19 (3) | 11 | 13 |
| Melamine-Sulfonamide-Formaldehyde Resin Containing a | | |

| | | |
|---|---|---|
| Fluorescent Green Dye and a Phthalocyanine Green Toner—A-18 (4) | 8 | — |
| Monastral Green B Polychloro Copper Phthalocyanine Toner—Color Index No. 74260 (5) | 1 | — |
| Black Magnetic Iron Oxide—MO-4232 (6) | — | 7 |
| Toluene | 67 | 67 |
| Total | 100 | 100 |

(2) through (6)—See example 2.

(8) Marketed by Allied Chemical Corporation, New York, N.Y., U.S.A. under the trade designation of AC-540. This copolymer has an acid number of 40, a needle penetration of 2 (ASTM D-1,321), a softening point of 226° F. (ASTM E-28) and a viscosity of 500 centipoises at 284° F.

(9) Marketed by Allied Chemical Corporation, supra, under the trade designation of AC-1,702. This homopolymer has a molecular weight of about 1,100.

(10) Marketed by Sun Oil Company, Philadelphia, Pa., U.S.A. under the trademark of Sunoco Wax 5,512. The paraffin wax has a needle penetration of 9 (ASTM D-1,321) and a minimum melting point of 156° F. (ASTM D-127).

The green and black printing ribbons were evaluated for print quality and resistance to scratching and smudging in accordance with the procedures set forth in example 2. The printed bars possessed excellent resistance to scratching and smudging upon visual examination and optical scanning.

This example illustrates that a copolymer of ethylene and acrylic acid and a homopolymer of ethylene can be used in place of the copolymer of ethylene and vinyl acetate.

EXAMPLE 5

Green and black transfer media, that is, printing ribbons, were prepared in accordance with the procedures set forth in example 2, using the same solvented coating compositions described in example 2, except that the copolymer of ethylene and vinyl acetate—AC-400 was replaced by the same amount of a copolymer of ethylene and vinyl acetate—AC-405 which is marketed by Allied Chemical Corporation, New York, New York, U.S.A. under the trade designation of AC-405. This copolymer contains about 3 to 5 percent by weigh of vinyl acetate and has a molecular weight of about 2,000.

The green and black printing ribbons were evaluated for print quality and resistance to scratching and smudging in accordance with the procedures set forth in example 2. The printed bars possessed excellent resistance to scratching and smudging upon visual examination and optical scanning.

This example illustrates that the copolymer of ethylene and vinyl acetate can contain a lower percentage of vinyl acetate.

EXAMPLE 6

Green and black transfer media, that is, printing ribbons, were prepared in accordance with the procedures set forth in example 2 using solvented coating compositions described below.

| Solvented Coating Compositions | | |
|---|---|---|
| | Parts by Weight | |
| Component | Green Composition | Black Composition |
| Copolymer of Ethylene and Vinyl Acetate—AC-401 (11) | 5.0 | 5.0 |
| Copolymer of Ethylene and Acrylic Acid—AC-540 (8) | 2.0 | 2.0 |
| Modified Microcrystalline Wax—WB-2 (2) | 5.0 | 5.0 |
| Paraffin Wax—5512 (10) | 2.0 | 2.0 |
| Melamine-Sulfonamide-Formaldehyde Resin Containing a Fluorescent Blue Dye and a Phthalocyanine Blue Toner—a-19 (3) | 11.0 | 19.25 |
| Melamine-Sulfonamide-Formaldehyde Resin Containing a Fluorescent Green Dye and a Phthalocyanine Green Toner—A-18 (4) | 8.0 | — |
| Monastral Green B Polychloro Copper Phthalocyanine Toner—Color Index No. 74260 (5) | 1.0 | — |
| Carbon Black—Royal Spectra (12) | — | 0.75 |
| Toluene | 66.0 | 66.0 |
| Total | 100.0 | 100.0 |

(2) through (5)—See example 2.

(11) Marketed by Allied Chemical Corporation, New York, N.Y., U.S.A. under the trade designation of AC-401. This copolymer contains about 10 percent by weight of vinyl acetate and has a molecular weight of about 3,000.

(12) Marketed by Columbian Carbon Company, New York, N.Y., U.S.A. under the trademark of Royal Spectra. This carbon black has a blackness index of 253 and a mean particle diameter of 10 mμ.

The green and black printing ribbons were evaluated for print quality and resistance to scratching and smudging in accordance with the procedures set forth in example 2. The printed bars possessed excellent resistance to scratching and smudging upon visual examination and optical scanning.

This example illustrates that a portion of the copolymer of ethylene and vinyl acetate can be replaced by a copolymer of ethylene and acrylic acid.

EXAMPLE 7

A black transfer media, that is, a printing ribbon, was prepared in accordance with the procedures set forth in example 2 using a solvented coating composition described below.

| Solvented Coating Composition | |
|---|---|
| Component | Parts by Weight |
| Copolymer of Ethylene and Vinyl Acetate—AC-400 (1) | 7.0 |
| Modified Microcrystalline Wax—WB-2 (2) | 6.0 |
| Melamine-Sulfonamide-Formaldehyde Resin Containing a Fluorescent Blue Dye and a Phthalocyanine Blue Toner—A-19 (3) | 19.25 |
| Carbon Black—Peerless 155 (13) | 0.75 |
| Toluene | 67.0 |
| Total | 100.0 |

(1) through (3)—See example 2.

(13) Marketed by Columbian Carbon Company, New York, N.Y., U.S.A. under the trademark of Peerless 155. This carbon black has a blackness index of 160 and a mean particle diameter of 22 mμ.

The black printing ribbon was evaluated with the green printing ribbon prepared in example 2 for print quality and resistance to scratching and smudging in accordance with the procedures set forth in example 2. The printed bars possessed excellent resistance to scratching and smudging upon visual examination and optical scanning.

This example illustrates that carbon black can be used in place of magnetic iron oxide as a sensible material.

EXAMPLE 8

A red transfer media, that is, a printing ribbon, was prepared in accordance with the procedures set forth in example 2 using a solvented coating composition described below.

| Solvented Coating Composition | |
|---|---|
| Component | Parts by Weight |
| Copolymer of Ethylene and Vinyl Acetate—AC-400 (1) | 7.0 |
| Modified Microcrystalline Wax—WB-2 (2) | 6.0 |
| Melamine-Sulfonamide-Formaldehyde Resin Containing a Fluorescent Red Dye—A-13 (14) | 14.25 |
| Barium Lithol Red—Color Index No. 15630 (15) | 0.75 |

| | |
|---|---|
| Toluene | 72.0 |
| Total | 100.0 |

(1) and (2)—See example 2.

(14) Marketed by Day-Glo Color Corp., Cleveland, Ohio, U.S.A. under the trademark of DAY-GLO Fluorescent Pigment Rocket Red A—13. This material comprises about 97 percent by weight of a thermoplastic melamine-sulfonamide-formaldehyde resin prepared in accordance with example 1 and about 3 percent by weight of a daylight fluorescent red dye. This material has a minimum luminance factor of 35 percent, a minimum purity of 77 percent and dominant wavelength of 620 to 627 millimicrons or nanometers determined in accordance with the daylight fluorescent color specification system described on pages 23 through 25 of the Day-Glo Color Corp. Technical Booklet No. 1,170–A.

(15) Marketed by The Sherwin-Williams Co., Cleveland, Ohio, U.S.A.

The red printing ribbon was evaluated with the black printing ribbon prepared in example 2 for print quality and resistance to scratching and smudging in accordance with the procedures set forth in example 2. In this example, the optical detection system was programmed to read information encoded in red, black and white bars. The printed bars possessed excellent resistance to scratching and smudging upon visual examination and optical scanning.

This example illustrates that other sensible materials can be used in the transferable coating composition.

EXAMPLE 9

A green transfer medium, that is, a printing ribbon, was prepared in accordance with the procedures set forth in example 2 using a solvented coating composition described below.

| Solvented Coating Composition Component | Parts by Weight |
|---|---|
| Copolymer of Ethylene and Vinyl Acetate—AC–400 (1) | 7 |
| Modified Microcrystalline Wax—WB–2 (2) | 6 |
| Melamine-Sulfonamide-Formaldehyde Resin (16) | 19 |
| Luxol Fast Green B Dye—Color Index (17)—Solvent Green 10—Page 2,887 of the Color Index | 1 |
| Toluene | 67 |
| Total | 100 |

(1) and (2)—See example 2.

(16) Marketed by Day-Glo Color Corp., Cleveland, Ohio, U.S.A. under the trademark of Sulfonamel. This resin is prepared in accordance with example 1 and U.S. Pat. No. 2,809,954, examples 1 through 6, and U.S. Pat. No. 2,938,873, examples 1 through 6.

(17) Marketed by E. I. du Pont de Nemours & Co., Inc., Wilmington, Del., U.S.A.

This melamine-sulfonamide-formaldehyde resin was heated to 300° F. and melted. The green dye was added to the melted resin and was thoroughly mixed in the melted resin to produce a uniform composition. The resin containing the dye was then allowed to cool to room temperature and solidify The resin containing the dye was then ground using a mortar and pestal until the particle size of the resin containing the dye was about 5 microns. The green printing ribbon was then prepared in accordance with the procedures set forth in example 2.

The green printing ribbon was evaluated with the black printing ribbon prepared in example 2 for print quality and resistance to scratching and smudging in accordance with the procedures set forth in example 2. The printed bars possessed excellent resistance to scratching and smudging upon visual examination and optical scanning.

This example illustrates that the sensible material can be incorporated in the aminotriazine-sulfonamide-formaldehyde resin prior to the formulating the transferable coating composition.

EXAMPLE 10

A black, magnetic transfer media, that is, a printing ribbon, was prepared in accordance with the procedures set forth in example 2 using a solvented coating composition described below.

| Solvented Coating Composition Component | Parts by Weight |
|---|---|
| Copolymer of Ethylene and Vinyl Acetate—AC–400 (1) | 7 |
| Modified Microcrystalline Wax—WB–2 (2) | 6 |
| Melamine-Sulfonamide-Formaldehyde Resin Containing a Fluorescent Blue Dye and a Phthalocyanine Blue Toner—A–19 (3) | 10 |
| Magnetic Cobalt Powder (18) | 10 |
| Toluene | 67 |
| Total | 100 |

(1) through (3)—See example 2.

(18) Marketed by Charles Pfizer & Co., New York, N.Y., U.S.A.

Twenty-four-pound safety paper (17 in. × 22 in. × 500 sheets) which is a commonly used paper for bank checks was encoded on a C-481 Encoder, manufactured by The National Cash Register Company, Dayton, Ohio, U.S.A., using the black, magnetic printing ribbon prepared in this example.

After the transferable coating composition was encoded or printed on the safety paper, the encoded safety paper was electronically scanned using calibrated measuring equipment comprising a Whirly Sig Mark II Magnetic Ink Tester, manufactured by Kidder Press Company, Dover, New Hampshire, U.S.A. connected to a Tektronix 564 Storage Oscilloscope, manufactured by Tektronix Incorporated, Beaverton, Ore. U.S.A., to determine the dynamic signal level of the encoded or printed characters on the safety paper and to establish a control on the nominal signal of one of the base characters. The signal level measuring instrument was calibrated using a secondary signal level reference document obtained from the Bank Administration Institute, Park Ridge, Ill. U.S.A. The signal level as used herein is defined as the amplitude of the voltage waveform produced when a direct current magnetized printed character is scanned by a suitable magnetic reading head.

The signal level of the electronically scanned encoded safety paper was of good quality and the signal waveforms were clean and free from extraneous signals of residual magnetic ink particles.

The example illustrates that the sensible material can be selected from a variety of sensible materials.

EXAMPLE 11

A black, magnetic transfer media, that is, a printing ribbon, was prepared in accordance with the procedures set forth in example 2 using the solvented coating composition described in example 10 with the exception that the cobalt powder was replaced by 10 parts by weight of black magnetic iron oxide marketed by Charles Pfizer & Co., New York, N.Y., U.S.A. under the trade designation of MO–4,232.

Twenty-four-pound safety paper (17 in. × 22 in. × 500 sheets) was encoded on a C-481 Encoder in the same manner as described in example 10. The encoded safety paper was electronically scanned in the same manner as described in example 10.

The signal level of the electronically scanned encoded safety paper was of good quality and the signal waveforms were clean and free from extraneous signals of residual magnetic ink particles as in example 10.

This example illustrates that the sensible material can be selected from a variety of sensible materials.

EXAMPLE 12

Green and black transfer media, that is, printing ribbons, were prepared in accordance with the procedures set forth in example 2 using solvented coating compositions described below.

Solvented Coating Compositions

| Component | Parts by Weight Green Composition | Parts by Weight Black Composition |
|---|---|---|
| Copolymer of Ethylene and Vinyl Acetate—AC-400 (1) | 7 | 7 |
| Modified Microcrystalline Wax—WB-2 (2) | 6 | 6 |
| Melamine-Sulfonamide-Formaldehyde Resin (16) | 18 | 13 |
| Monastral Green B Phthalocyanine Polychloro Copper Toner—Color Index No. 74260 (5) | 2 | — |
| Black Magnetic Iron Oxide—MO-4232 (6) | — | 7 |
| Toluene | 67 | 67 |
| Total | 100 | 100 |

(1), (2), (5) and (6)—See example 2.

(16)—See example 9.

The green and black printing ribbons were evaluated for print quality and resistance to scratching and smudging in accordance with the procedures set forth in example 2. The printed bars possessed excellent resistance to scratching and smudging upon visual examination and optical scanning.

This example illustrates that the sensible material does not necessarily have to be added to the aminotriazine-melamine-formaldehyde resin prior to the formulation of the coating composition.

EXAMPLE 13

Green and black transfer media, that is, printing ribbons, were prepared in accordance with the procedures set forth in example 2 using the solvented coating compositions described in example 12 except that other waxes were evaluated in place of the modified microcrystalline wax. A paraffin, carnauba, montan and amide waxes were each evaluated in an amount of 6 parts by weight of wax, the same as was used for the modified microcrystalline wax. The solvented coating composition was varied slightly for the microcrystalline wax. In the case of the microcrystalline wax the green and black solvented coating compositions contained respectively the following parts by weight: copolymer of ethylene and vinyl acetate—4.2 and 4.2; microcrystalline wax—3.6 and 3.6; melamine-sulfonamide-formaldehyde resin—10.8 and 7.8; green toner—1.2 and 0; iron oxide—0 and 4.2; toluene—80.1. The following waxes were evaluated.

1. A paraffin wax having a needle penetration of 4 (ASTM D-1,321) and a minimum melting point of 182° F. (ASTM D-87). This wax is marketed by Shell Oil Company, New York, N.Y., U.S.A. under the trademark of Shell-wax 700.
2. A carnauba Inc., having an acid number of 4 to 10 (ASTM D-1,386), a saponification number of 78 to 88 (ASTM D-1,387), a needle penetration of 3 (ASTM D-1,321) and a minimum melting point of 181° F. (ASTM D-127). This wax is marketed by Frank B. Ross Co., Inc. Jersey City, N.J., U.S.A. under the trade designation of Fatty Grey or No. 3 North Country.
3. A montan wax having an acid number of 28 to 35 (ASTM D-1,386), a saponification number of 83 to 100 (ASTM D-1,387), a needle penetration of 3 (ASTM D-1,321) and a minimum melting point of 180° to 190° F. (ASTM D-127). This wax is marketed by Strohmeyer & Arpe Company, New York, N.Y., U.S.A. under the trademark of Riebeck-Romonta montan wax.
4. An amide wax which is substantially an organic carboxylic acid wherein the hydroxyl or OH groups have been substantially replaced with amino or NH$_2$ groups. This wax has a free fatty acid content of 5 percent, an iodine number of 5, and a solidification point of 208° F. (ASTM D-87-42). This wax is marketed by Armour and Company, Chicago, Ill., U.S.A. under the trademark of Armid HT and has the approximate amide composition of 22 percent palmitamide, 75 percent stearamide and 3 percent oleamide.
5. A microcrystalline wax having a needle penetration of 5 (ASTM D-1,321) and a minimum melting point of 193 (ASTM D-127). This wax is marketed by the Sun Oil Company, Philadelphia, Pa., U.S.A. under the trademark of Sunoco Wax 985 Yellow.

The green and black printing ribbons were evaluated for print quality and resistance to scratching and smudging in accordance with the procedures set forth in example 2. The printed bars possessed excellent resistance to scratching and smudging upon visual examination and optical scanning.

This example illustrates that a variety of waxes can be used in the transferable coating composition of the present invention.

EXAMPLE 14

Green and black transfer media, that is, printing ribbons, were prepared in accordance with the general procedures set forth in example 2 using the solvented coating compositions described below. In this example, there was no melamine-sulfonamide-formaldehyde resin added to either of the coating compositions.

Solvented Coating Compositions

| Component | Parts by Weight Green Composition | Parts by Weight Black Composition |
|---|---|---|
| Copolymer of Ethylene and Vinyl Acetate—AC-400 (1) | 10.9 | 10.5 |
| Modified Microcrystalline Wax—WB-2 (2) | 9.4 | 9.0 |
| Monastral Green B Phthalocyanine Polychloro Copper Toner—Color Index No. 74260 (5) | 1.3 | — |
| Black Magnetic Iron Oxide—MO-4232 (6) | — | 5.3 |
| Toluene | 78.4 | 75.2 |
| Total | 100.0 | 100.0 |

(1), (2), (5) and (6)—see example 2.

The green and black printing printing ribbons were evaluated for print quality and resistance to scratching and smudging in accordance with the procedures set forth in example 2. The printed bars possessed very poor resistance to scratching and smudging upon visual examination and optical scanning.

This example illustrates the importance of the melamine-sulfonamide-formaldehyde resin in the coating composition to produce excellent scratch and smudge resistance in the printed bars.

EXAMPLE 15

Green and black transfer media, that is, transfer sheets, were prepared in accordance with the procedures set forth in example 2, using the same solvented coating compositions described in example 2. Some of the transfer sheets were subjected to a heat treatment at a temperature of about 200° to 250° F. for about 2 minutes to thermally fuse the components of the coating compositions and more thoroughly bond the coating compositions to the polyethylene terephthalate films. The heat was supplied by a forced air heater.

Heat-treated and non-heat-treated transfer sheets were evaluated for thermal printing performance in a NCR Class EMT-1 Thermal Page Printer manufactured by The National Cash Register Company, Dayton, Ohio, U.S.A.

The heat-treated and non-heat-treated transfer sheets were evaluated for print quality and resistance to scratching and smudging in accordance with the procedures set forth in example 2. Both the heat-treated and non-heat-treated transfer sheets produced excellent thermal printing which had excellent resistance to scratching and smudging. While both transfer sheets produced excellent thermal printing, the heat-treated transfer sheet was superior in performance to the non-heat-treated transfer sheet.

This example illustrates that superior transfer media for thermal printing can be prepared by heat treating and transfer media prior to transfer of the coating composition.

It is claimed:

1. A transfer medium comprising a base having a transferable coating composition thereon said coating composition comprising about 3 to 40 percent by weight of an olefinic polymer selected from the group consisting of a homopolymer of ethylene having a molecular weight of about 1,500 to 12,000, a copolymer of ethylene and a vinyl ester containing four to about six carbon atoms having a vinyl ester content of about 3 to 50 percent by weight based upon the total weight of the copolymer and a molecular weight of about 1,500 to 12,000, a copolymer of ethylene and a lower alkyl acrylate having a lower alkyl acrylate content of about 3 to 50 percent by weight based upon the total weight of the copolymer and a molecular weight of about 1,500 to 12,000, a copolymer of ethylene and a lower alkyl methacrylate having a lower alkyl methacrylate content of about 3 to 50 percent by weight based upon the total weight of the copolymer and a molecular weight of about 1,500 to 12,000, a copolymer of ethylene and acrylic acid having an acrylic acid content of about 3 to 50 percent by weight based upon the total weight of the copolymer and a molecular weight of about 1,500 to 12,000, a copolymer of ethylene and methacrylic acid having a methacrylic acid content of about 3 to 50 percent based upon the total weight of the copolymer and a molecular weight of about 1,500 to 12,000, a copolymer of ethylene and propylene having a propylene content of about 3 to 97 percent by weight based upon the total weight of the copolymer and a molecular weight of about 1,500 to 12,000, a homopolymer of propylene having a molecular weight of about 1,500 to 12,000, and mixtures thereof; about 3 to 40 percent by weight of a wax having a melting point of about 150° to 220° F. and a needle penetration of about 1 to 9; about 15 to 70 percent by weight of a thermoplastic aminotriazine-sulfonamide-aldehyde resin said resin comprising the condensation product of at least one aldehyde selected from the group consisting of formaldehyde and paraformaldehyde, at least one aromatic monosulfonamide having two reactive amide hydrogens where the sulfonamido group is attached directly to the aromatic nucleus through the sulfur atom, and at least one aminotriazine having at least two amino groups, the amount of said aminotriazine being between about 17 to 50 mole percent of said monosulfonamide and the total amount of said aldehyde constituent being at least in excess of the total amount of said sulfonamide and aminotriazine constituents on a molar basis; and about 1 to 45 percent by weight of a sensible material.

2. The transfer medium of claim 1 wherein the olefinic polymer is a homopolymer of ethylene having a molecular weight of about 2,000 to 8,000 and is present in the coating composition in an amount of about 15 to 25 percent by weight.

3. The transfer medium of claim 1 wherein the olefinic polymer is a copolymer of ethylene and vinyl acetate having a vinyl ester content of about 5 to 35 percent by weight based upon the total weight of the copolymer and a molecular weight of about 2,000 to 8,000 said olefinic polymer being present in the coating composition in an amount of about 15 to 25 percent by weight.

4. The transfer medium of claim 1 wherein the olefinic polymer is a copolymer of ethylene and ethyl acrylate having a vinyl ester content of about 5 to 35 percent by weight based upon the total weight of the copolymer and a molecular weight of about 2,000 to 8,000, said olefinic polymer being present in the coating composition in an amount of about 15 to 25 percent by weight.

5. The transfer medium of claim 1 wherein the olefinic polymer is a copolymer of ethylene and ethyl methacrylate having a vinyl ester content of about 5 to 35 percent by weight based upon the total weight of the copolymer and a molecular weight of about 2,000 to 8,000, said olefinic polymer being present in the coating composition in an amount of about 15 to 25 percent by weight.

6. The transfer medium of claim 1 wherein the olefinic polymer is a copolymer of ethylene and acrylic acid having an acrylic acid content of about 5 to 35 percent by weight and a molecular weight of about 2,000 to 8,000, said olefinic polymer being present in the coating composition in an amount of about 15 to 25 percent by weight.

7. The transfer medium of claim 1 wherein the olefinic polymer is a copolymer of ethylene and methacrylic acid having a methacrylic acid content of about 5 to 35 percent by weight and a molecular weight of about 2,000 to 8,000, said olefinic polymer being present in the coating composition in an amount of about 15 to 25 percent by weight.

8. The transfer medium of claim 1 wherein the olefinic polymer is a copolymer of ethylene and propylene having a propylene content of about 5 to 35 percent by weight and a molecular weight of about 2,000 to 8,000, said olefinic polymer being present in the coating composition in an amount of about 15 to 25 percent by weight.

9. The transfer medium of claim 1 wherein the olefinic polymer is a homopolymer of propylene having a molecular weight of about 2,000 to 8,000 and is present in the coating composition in an amount of about 15 to 25 percent by weight.

10. The transfer medium of claim 1 wherein the wax is a modified microcrystalline wax and is present in the coating composition in an amount of about 15 to 25 percent by weight.

11. The transfer medium of claim 1 wherein the wax is a microcrystalline wax and is present in the coating composition in an amount of about 15 to 25 percent by weight.

12. The transfer medium of claim 1 wherein the wax is a paraffin wax and is present in the coating composition in an amount of about 15 to 25 percent by weight.

13. The transfer medium of claim 1 wherein the wax is a carnauba wax and is present in the coating composition in an amount of about 15 to 25 percent by weight.

14. The transfer medium of claim 1 wherein the wax is a montan wax and is present in the coating composition in an amount of about 15 to 25 percent by weight.

15. The transfer medium of claim 1 wherein the wax is an amide wax and is present in the coating composition in an amount of about 15 to 25 percent by weight.

16. The transfer medium of claim 1 wherein the aminotriazine component of the thermoplastic resin is melamine and said resin is present in the coating composition in an amount of about 50 to 65 percent by weight.

17. The transfer medium of claim 1 wherein said sensible material is a green dye or pigment.

18. The transfer medium of claim 1 wherein said sensible material is a red dye or pigment.

19. The transfer medium of claim 1 wherein said sensible material is a black dye or pigment.

20. The transfer medium of claim 1 wherein said sensible material is a magnetic metal or oxide thereof.

21. The transfer medium of claim 1 wherein said sensible material is invisible to the naked eye under ordinary light.

22. The transfer medium of claim 1 wherein the sensible material is present in the coating composition in an amount of about 2 to 20 percent by weight.

23. The transfer medium of claim 1 wherein said base is a thin material.

24. The transfer medium of claim 23 wherein said base is a polymeric material.

25. The transfer medium of claim 24 wherein said base is a film of polyethylene terephthalate.

26. The transfer medium of claim 1 wherein the aminotriazine resin has a particle size of about 3 microns and is at least partially soluble in a volatile organic solvent, and the transferable coating composition has a thickness of about 0.2 to 0.6 mils.

* * * * *